(12) United States Patent
Hernacki

(10) Patent No.: US 7,792,147 B1
(45) Date of Patent: Sep. 7, 2010

(54) EFFICIENT ASSEMBLY OF FRAGMENTED NETWORK TRAFFIC FOR DATA SECURITY

(75) Inventor: Brian Hernacki, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 925 days.

(21) Appl. No.: 10/775,537

(22) Filed: Feb. 9, 2004

(51) Int. Cl.
  *H04J 3/24* (2006.01)
(52) U.S. Cl. .................................. 370/474; 726/23
(58) Field of Classification Search ................ 370/474, 370/400; 726/22–25; 713/188; 709/224, 709/220–221
See application file for complete search history.

(56) References Cited

U.S. PATENT DOCUMENTS

| | | | | |
|---|---|---|---|---|
| 6,496,935 B1* | 12/2002 | Fink et al. ..................... | 726/13 |
| 6,714,985 B1* | 3/2004 | Malagrino et al. .......... | 709/236 |
| 6,975,647 B2* | 12/2005 | Neale et al. .................. | 370/466 |
| 2003/0048793 A1* | 3/2003 | Pochon et al. .............. | 370/401 |
| 2004/0003286 A1* | 1/2004 | Kaler et al. .................. | 713/201 |
| 2004/0083385 A1* | 4/2004 | Ahmed et al. ............... | 713/201 |
| 2004/0093513 A1* | 5/2004 | Cantrell et al. .............. | 713/201 |
| 2004/0093521 A1* | 5/2004 | Hamadeh et al. ............ | 713/201 |
| 2004/0205228 A1* | 10/2004 | Rose et al. ................... | 709/236 |
| 2006/0098585 A1* | 5/2006 | Singh et al. .................. | 370/252 |
| 2007/0124455 A1* | 5/2007 | Motoyama et al. .......... | 709/224 |

* cited by examiner

*Primary Examiner*—Kwang B Yao
*Assistant Examiner*—Tung Q Tran
(74) *Attorney, Agent, or Firm*—Hunton & Williams LLP

(57) ABSTRACT

Optimizing data security using fragment assembly is described. Additionally, optimizing security in data traffic is also described, including reassembling data traffic using a fragment, scanning a datagram in the data traffic in accordance with a protocol, and detecting an anomaly in the data traffic based on evaluating the datagram. By scanning and detecting an anomaly contained in a data fragment, packet, segment, stream or other encapsulation technique, further processing may be invoked in order to determine whether a threat or attack to an end host exists.

18 Claims, 8 Drawing Sheets

Go to Figure 6B

EFFICIENT ASSEMBLY OF FRAGMENTED NETWORK TRAFFIC FOR DATA SECURITY

FIELD OF THE INVENTION

The present invention relates generally to data security. More specifically, efficient assembly of fragmented network traffic for data security is disclosed.

BACKGROUND OF THE INVENTION

Data security can be compromised by exploiting aspects of the underlying network protocols used for transport, specifically, aspects related to the processing and reassembly of data at end host destinations. Protocols such as TCP, IP, UDP, etc. specify how a datagram (i.e., packet, fragment, segment, stream, etc.) is handled during data communication. Variations in transmission, reception, and interpretation may result in different interpretations of reassembled data received at an end host and another inline device or application (e.g., firewall, network security management, intrusion detection, vulnerability assessment, etc.). Protocols may be manipulated in such a manner that this ambiguity can be used to hide the presence of a threat from a security device.

When datagrams are broken into packets, fragments, segments, etc. and transmitted (e.g., using TCP, etc.), an attacker may be able to confuse an intrusion detection system, vulnerability assessment, firewall, or other type of security application. This exploitation of data communication using a particular type of protocol (e.g., IP) may result in the reassembly of data different at an end host destination as opposed to an inline security application. This provides an opportunity to deliver an attack against an end host which is not detected by the security device since it is possible for the attacker to send packets in such a manner that the security device and the end host reassemble the traffic differently. In order to prevent this, a security device must be able to accurately process the packets in the same manner as the end host. Given the size and scope of the problem, efficiency of such processing is also important, Thus, what is needed is a solution for detecting threats despite the use of such methods (evasion by fragmentation) while optimizing packet reassembly.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
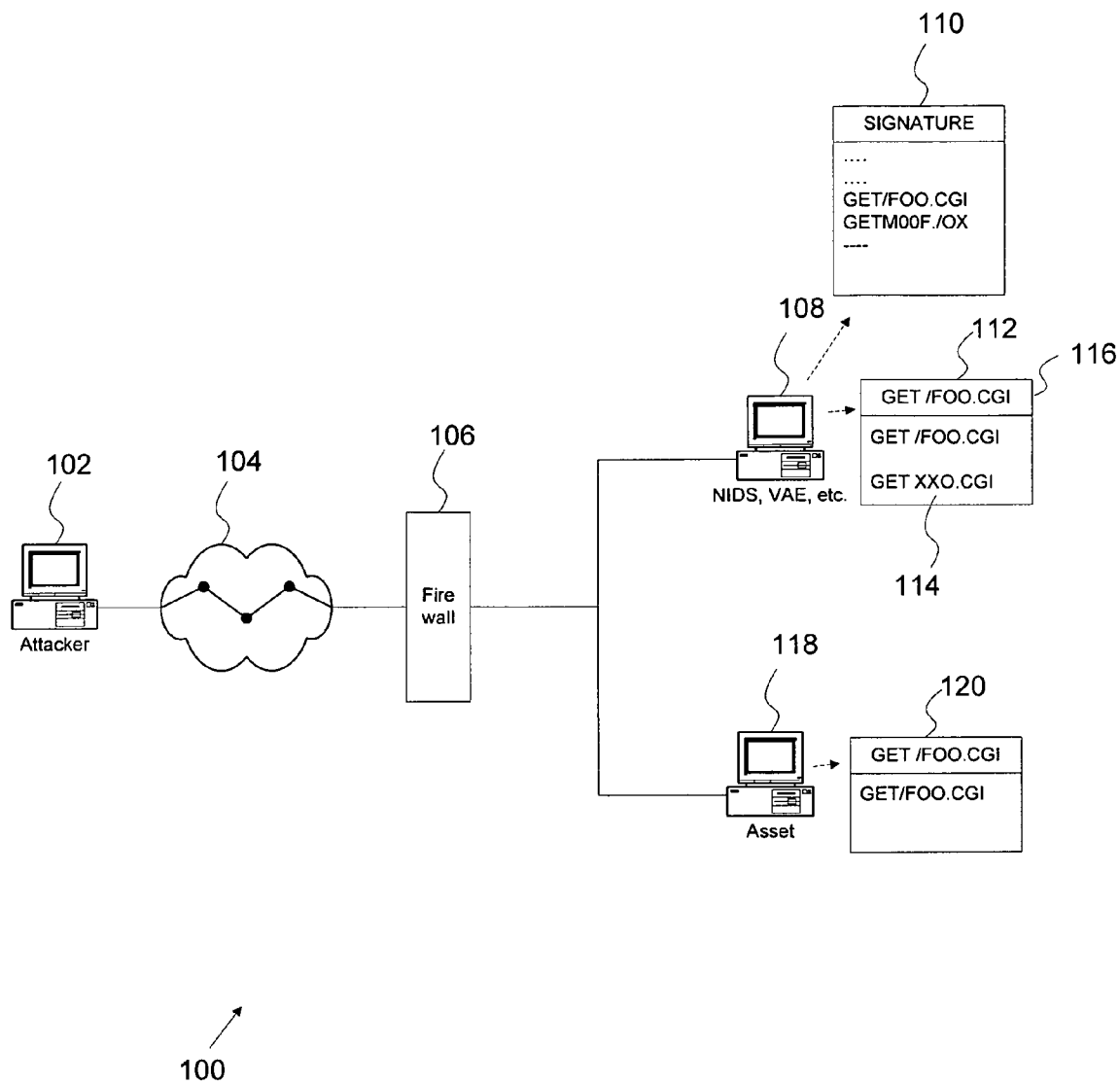
FIG. 1 illustrates a system for efficient assembly of fragmented network traffic for data security, in accordance with an embodiment.

FIG. 1 illustrates a system for efficient assembly of fragmented network traffic for data security. System 100 shows an attacker 102 transmitting data across a network 104, which may include one or more nodes (as illustrated), sending data to an inline security device such as firewall 106. In other examples, firewall 106 may be replaced by other types of inline devices or applications for security management, intrusion detection, network security, etc. In still other embodiments, firewall 106 may be combined with an end host 108 in an inline configuration. Downstream of firewall 106, an end host 108 and a destination host 118 are present. In this example, end host 108 may be a computer, server, router, switch, or other type of computing device having an installed security application or system (e.g., network security, security management, intrusion detection, vulnerability assessment, etc.). End host 108 has an installed security application, such as those described above, while destination host 118 is the intended recipient of the data traffic stream.

A signature table 110 and flow table 112 may be used by end host 108 to determine whether an incoming datagram is valid/authenticated or not. Flow table 112 may be used to represent a connection that is tracked by the particular device to which it is assigned. A data traffic stream or data stream may be broken into datagrams, a smaller unit of data transmission that can vary with different protocols (e.g., UDP, TCP, IP, WAP, etc.). As used herein, a datagram may be a packet, segment, fragment, or other type of data encapsulation.

As datagrams are received by host 108, information contained in the datagram of the packets are evaluated to determine whether to reassemble, hold, process, or discard the packets. Prior to this evaluation, the headers of the datagram are used to assemble the data into the appropriate order 116. If fragmented datagrams are received, the host 108 decides how to assemble them. If ambiguities exist in the protocol used (e.g. IP), then the resulting assembled data 114 may have several possible variations. For example, and as explained in more detail below in connection with FIG. 2, if consecutive data fragments are sent with an overlapping offset, depending on the protocol used and the configuration of the host receiving the fragments (e.g., operating system, etc.) the fragments may be reassembled in different ways, as illustrated by the two options shown in assembled data 114. If such an ambiguity exists and the host 108 resolves the ambiguity differently than the asset host 118, the host 108 may reassemble the fragmented datagrams differently than the asset host 118, with the result that the network intrusion detection system (NIDS) or other security process running on the host 108 may see different data going to the asset host 108 than the asset host 108 actually received. In this example, the data 116 as reassembled at host 108 is compared to known invalid forms of data in the signature table 110. If a match occurs, then the packets are invalidated and identified for further processing (e.g., discard, hold, etc.). If not, then the packets will continue to be processed normally. Similarly host 118 also has a flow table 120 for reassembling received data packets, fragments, segments, etc. Host 118 processes the incoming datagram and inserts it into the data pool for the flow. Datagram headers identify where to insert the particular datagram into the data pool. In the cases of a fragmented datagram, the host 118 applies a local policy to determine how to process and insert the fragments. As noted above, if the local policy for reassembling fragmented datagrams applied by host 118 is different than the corresponding policy applied by the host 108, e.g., because they have different operating systems and/or are otherwise configured differently, the result may be that the NIDS or other security process running on host 108 may see in the flow associated with asset host 118 data matching an attack signature when in fact the data as received by asset host 118 is innocuous, resulting in a false positive result at the NIDS, or the NIDS may see in the flow only innocuous data when in fact the data as received by asset host 118 matches an attack signature that would otherwise have been detected by the NIDS.

Figure 2:
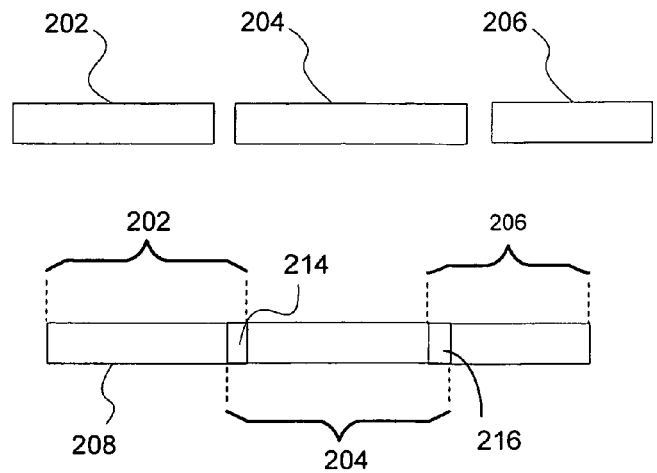
FIG. 2 illustrates a comparison of datagrams, in accordance with an embodiment.

FIG. 2 further illustrates fragment overlap. Fragments 202-206 represent a single data packet that has been segmented. Using protocols such as TCP, fragments 202-206 may remain separated during transmission and reassembled upon receipt at a destination host (e.g., host 118). If the fragments overlap, as with fragments 202-206 as shown in the lower portion of FIG. 2, with overlap areas 214 and 216 labeled, the presence of the overlap may indicate an attempt to exploit differences in the way the security host reassembles overlapping fragments and the way the destination (i.e., target) host reassembles overlapping fragments, as described above. Further processing could impose significant latency or processing requirements upon both a destination host and the security host, but by identifying conditions such as fragment overlap that might be used to evade or deceive a security system or application and only performing increased analysis to detect such evasion or deception when such a condition is present, data traffic can be efficiently scanned for potential or actual attacks.

Figure 3:
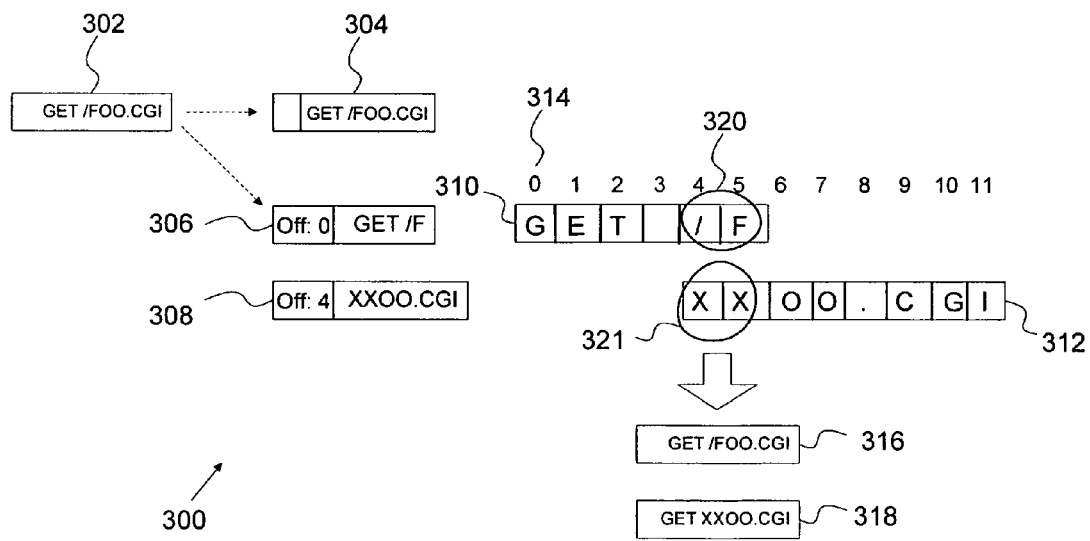
FIG. 3 illustrates fragment mismatch, in accordance with an embodiment.

FIG. 3 illustrates a comparison of overlapping fragments, in accordance with an embodiment. A datagram 302 can be transmitted as a single packet 304 or as a series of fragments 306, 308. In this example, datagrams 306 and 308 can be transmitted in groups of bits of varying group size, depending upon the protocol in use. In the case of multiple fragments, the fragments are intended to assemble into the same resulting data as the original single packet (in the non-malicious case). Data held in fragments 306 and 308 may be referenced by their position. The data portions of the datagram thus contain portions of the original data, segmented in a linear fashion. These data portions may be represented as an ordered, numbered sequence of bytes, beginning with byte 0. For example, the byte (of varying bit-length, depending upon the type of protocol) representing "G" is in position 314 of fragment 306, also identified as "byte 0". In the example, 310 represents the data bytes of datagram 306 and 312 the data bytes of datagram 308. 310 represents bytes 0 through 5 and 312 represents bytes 4 through 11. During reassembly, the two sequences are joined to form a single sequence. If the two sequences do not overlap, joining them is accomplished by concatenation of the two sequences. However, if overlap exists (such as at bytes 320 and bytes 321), then the assembler must determine which value to use. In our example, if the bytes 320 are used, the resulting assembled form is 316. If the bytes 321 are used, the resulting form is 318. The two possible resulting forms are different.

In this example, the detection of situation in which fragmented data might be reassembled different on the network security host (e.g., host 108 of FIG. 1) than on a protected host system (e.g., asset host 118 of FIG. 1) may indicate an attempt on the part of an attacker 102 to either evade detection by the security process running on the security host while conducting an attack on a protected host, or to deceive the security process into believing that an protected host is being attacked when in fact it is not. Upon detection of such a potential deception or evasion, such as may be indicated by the receipt of fragments having overlapping offsets, in some embodiments an enhanced buffering and reassembly process, described more fully below, may be initiated to enable the security process to reassemble the data in all of the possible ways that the protected host might reassemble the data, e.g., to determine whether any of the possible results could be used to compromise the protected host. In other embodiments, if a fragment offset overlap or some other anomaly that could result in the protected host reassembling fragments differently from the security host is detected, the security process running on the security host may be configured to query the protected host, or an information base, to determine the configuration of the protected host to the extent required to know how the protected host reassembled the fragments, which would allow the security process to determine if the data as reassembled by the protected host constitutes a threat. In other embodiments, different actions may be taken upon discovering an anomaly in a bit stream, which are discussed in greater detail below.

Figure 4:
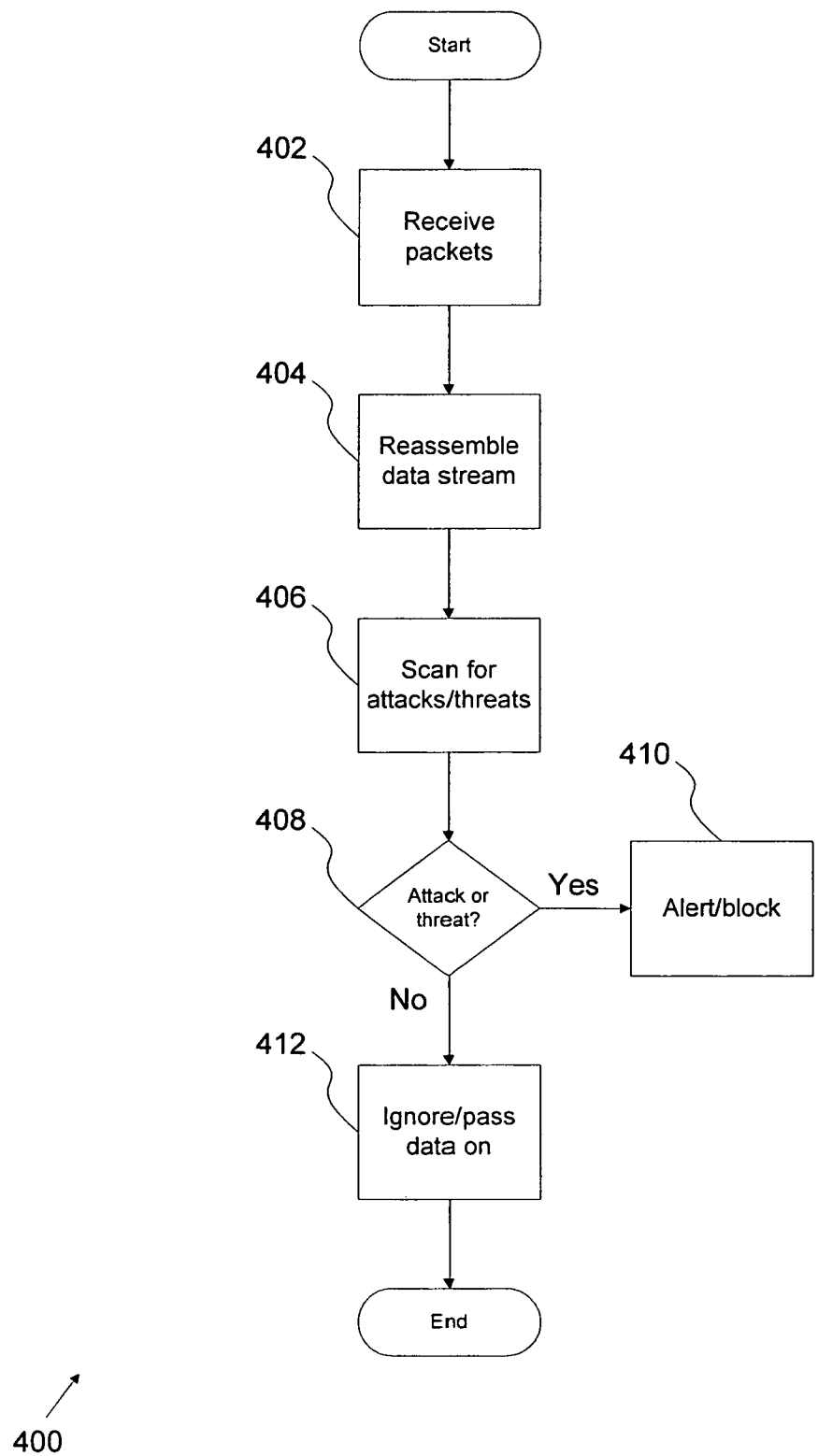
FIG. 4 illustrates a process for efficient assembly of fragmented network traffic for data security, in accordance with an embodiment.

FIG. 4 illustrates a process (400) for monitoring network traffic for data security, in accordance with an embodiment. One or more packets are received, for example, from an attacker 102 (402). As datagrams are received, a data traffic stream is re-assembled (404). As the data traffic stream is reassembled, packets are scanned for attacks and threats (406). Scanning the data traffic stream for anomalies, as described above, may be used to determine whether an attack or threat has occurred or is in progress (408). If an attack or threat is detected, then the data traffic stream may be blocked from reaching destination 108, if the security system or application is so configured, and/or an alert may be sent to a network security manager or some other recipient or system (410). If no attack or threat is detected, then the packets are ignored and, if necessary, forwarded to their destination (412).

Figure 5:
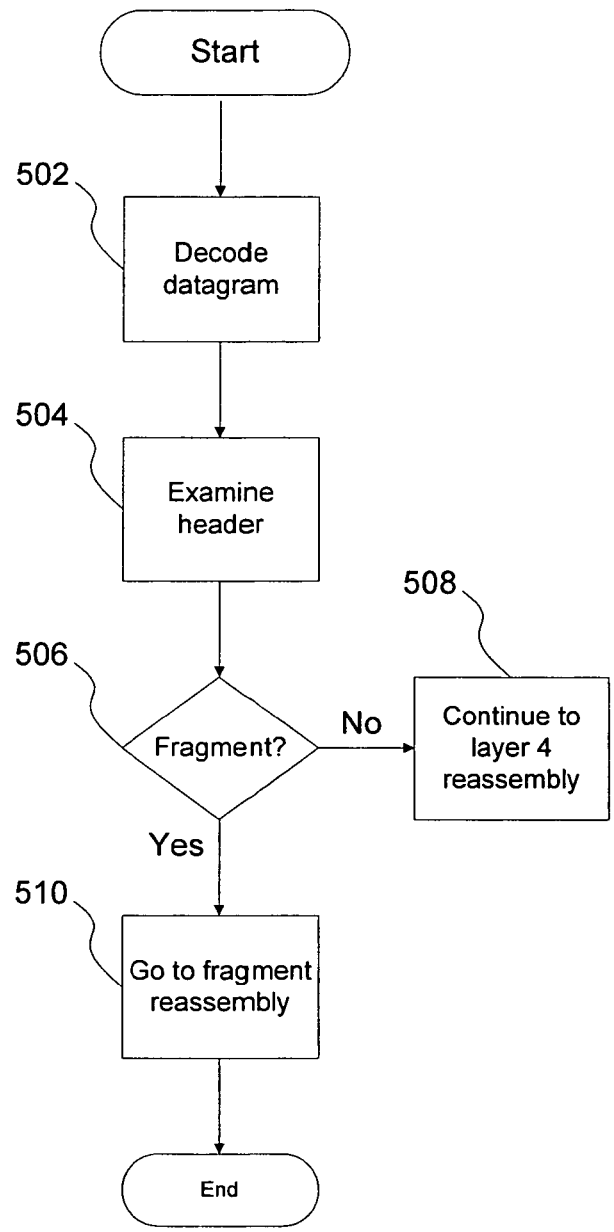
FIG. 5 illustrates a process for reassembling a data stream, in accordance with an embodiment.

FIG. 5 illustrates a process for reassembling a data stream, as in step 404 of FIG. 4, in accordance with an embodiment. In this embodiment, a datagram is decoded during reassembly (502). Once decoded, the datagram may be examined to resolve the data into a header and payload (504). The datagram and its respective header and payload are examined further to determine whether the datagram is a fragment of a larger data traffic stream (506). If the datagram is not a fragment (i.e., not a fragment of a larger data packet), then reassembly may be automatic and extended throughout other layers of the network stack, such as layer 4 (508). If the datagram is a fragment of a larger data traffic stream, then fragment reassembly occurs, as described below in connection with FIGS. 6A and 6B (510).

Figure 6A:
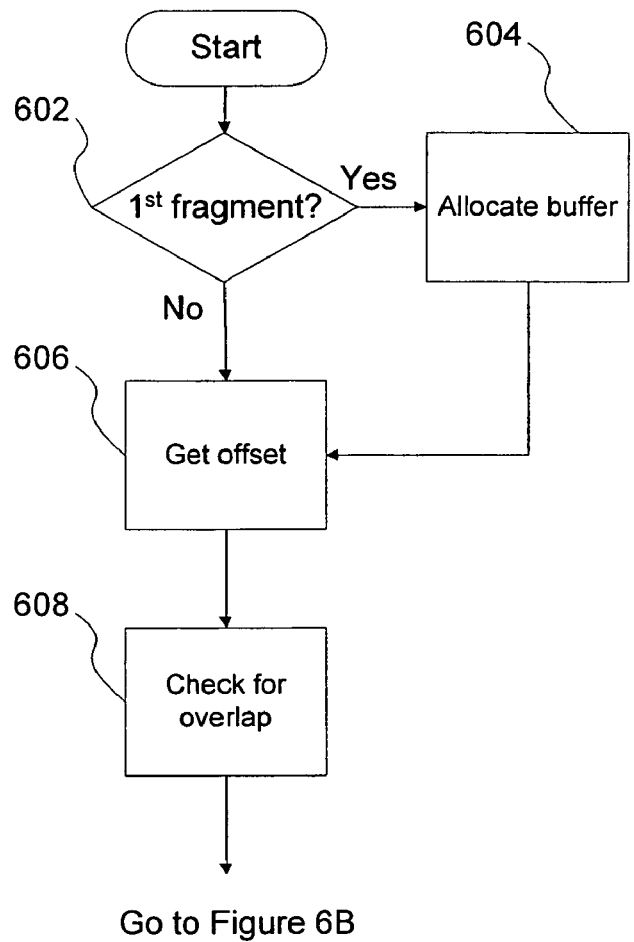
FIG. 6A illustrates a process for fragment reassembly, in accordance with an embodiment.
Figure 6B:
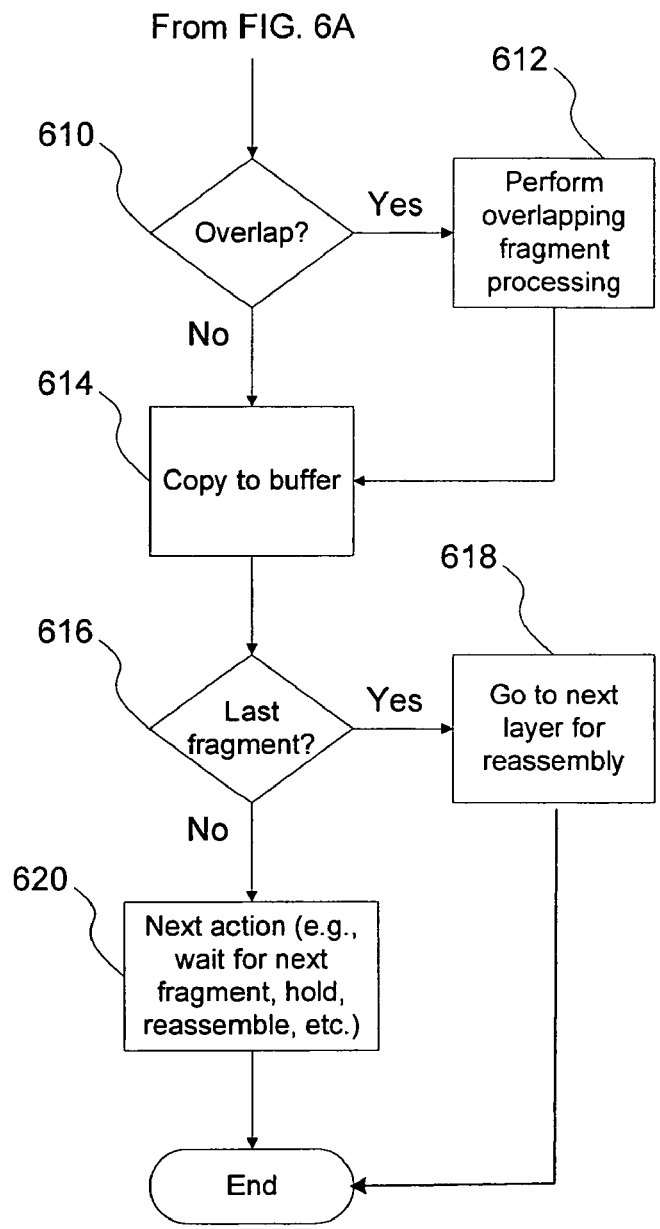
FIG. 6B illustrates a further process for fragment reassembly, in accordance with an embodiment.

FIGS. 6A and 6B illustrate a process for fragment reassembly, in accordance with an embodiment. In this example, fragments may be reassembled in order to reconstruct transmitted data into its original form as it was transmitted from a source across one or more networks. Referring first to FIG. 6A, a determination is made as to whether a fragment under evaluation is the first fragment to be reassembled (602). If a fragment is the first fragment to be received, then it is stored in a memory (e.g., a buffer) allocated for the purpose of storing the first fragment and subsequently received fragments for reassembly (604).

If a fragment is not the first fragment to undergo reassembly, then the packet header is read to determine the offset value for the fragment (606).

In this embodiment, once an offset, if any, has been determined, the fragments are checked to determine whether there is overlap (608). If overlap exists between the fragments, then an anomaly may be present, indicating a potential attack or intrusion.

Referring now to FIG. 6B it is determined whether the check performed in step 608 indicated that an overlap exists (610). If overlap exists between fragments, then overlapping fragment processing is performed (612).

If no overlap exists (610), or once overlap fragment processing has been performed (612), the fragment is copied to a buffer or memory (614). Subsequently, a check is performed to determine whether the examined datagram is the last fragment (616). If the examined datagram is a last fragment, then reassembly occurs at the next layer of the network stack or model (618), and the process of FIGS. 6A and 6B ends. If the examined datagram is not the last datagram, then process waits for the next fragment to be received (620). Subsequent fragments are processed as described above until the last fragment is reached and the successive iterations of the process shown in FIGS. 6A and 6B required to process the fragmented datagram ends.

Figure 7:
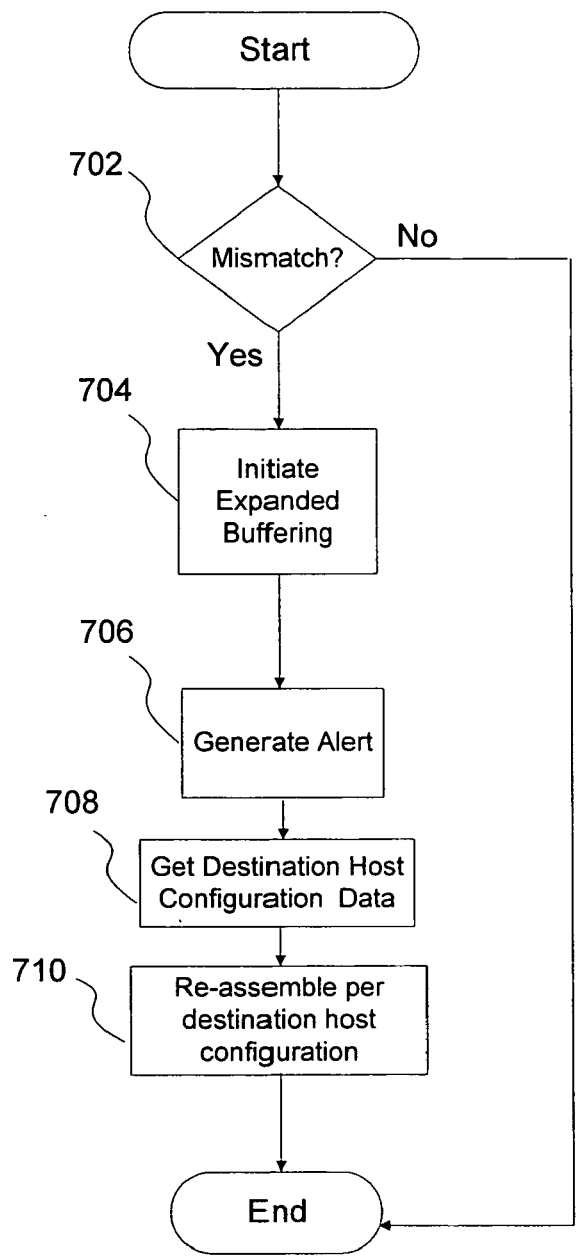
FIG. 7 illustrates a process used in an embodiment to process overlapping fragments, as in step 612 of FIG. 6B.

FIG. 7 illustrates a process used in an embodiment to process overlapping fragments, as in step 612 of FIG. 6B. In step 702, the overlapping portions of the fragments are compared to determine whether they are the same. If they are the same, the process of FIG. 7 ends and the overlapping fragments are processed normally (i.e., the overlap is resolved in accordance with the configuration of the security system/application host. If there is a mismatch, i.e., one fragment has different data than the other for the overlapping portion, the process proceeds to step 704, in which expanded buffering is initiated. The expanded buffering is initiated to ensure that overlapping fragments are stored so as to be available for further processing, as described more fully below. In some embodiments, expanded buffering may be initiated as soon as overlapping fragments are detected, i.e., regardless of whether and/or before a determination is made regarding whether the overlapping portions do not match. In some embodiments, step 702 is omitted and the remaining steps of FIG. 7 performed regardless of whether there is a mismatch. In step 706, an alert is generated. For example, an alert may be sent to a network security administrator indicating that overlapping fragments with mismatched data for the overlap portion have been detected, which as described herein could indicate an attempt to evade a security system or application. In step 708, the security system or application determines the configuration of the destination (target) host associated with the flow to which the overlapping fragments pertain. Specifically, the security system or application determines how the target host is configured to reassemble overlapping fragments (e.g., whether it uses for the overlap portion the data from the first-received fragment or instead the data from the later-received fragment). In some embodiments, step 708 may comprise querying an information base. In some embodiments, step 708 may comprise querying the destination (target) host. In step 710, the overlapping fragments are reassembled in accordance with the configuration of the destination (target) host. This allows the security system or application to see the data flow as it actually is reassembled by and appears to the target host. In this way, when the data is compared to known attack signatures, e.g., an attack is detected if the data as reassembled by the target host would comprise an attack.

The approach of FIG. 7 conserves processing resources by ensuring that the target host configuration is determined, to enable the overlapping fragments to be reassembled in accordance with that configuration, only if an anomaly (overlapping fragments with data mismatch) is detected. Also, resources are conserved by only reassembling the fragments in one of the possible ways. However, the approach shown in FIG. 7 requires that the network security requirements and systems/applications be such that the latency required to determine the configuration of the target host (step 708) can be tolerated.

Figure 8:
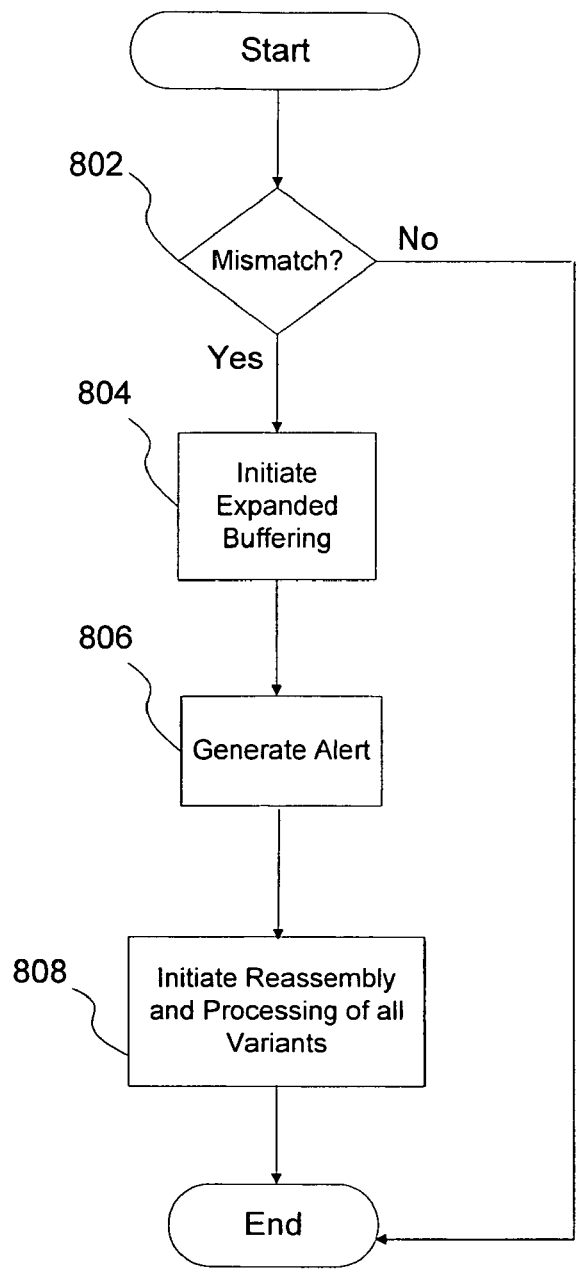
FIG. 8 illustrates a process used in an embodiment to process overlapping fragments, as in step 612 of FIG. 6B, under conditions in which the latency of the process shown in FIG. 7 is unacceptable or not desired.

FIG. 8 illustrates a process used in an embodiment to process overlapping fragments, as in step 612 of FIG. 6B, under conditions in which the latency of the process shown in FIG. 7 is unacceptable or not desired. Steps 802, 804, and 806 are the same as steps 702, 704, and 706 of FIG. 7, respectively. In step 808, the reassembly and processing of all variants of the associated data flow is initiated. In this approach, rather than determine the configuration of the destination host, the data flow is reassembled using all possible approaches and further analysis is performed to determine whether any variant of the flow matches an attack signature. For example, in step 808 a data flow with mismatching overlapping portions, or any data flow with overlapping portions in an embodiment in which step 802 is omitted, might be reassembled first by using the bits from the first-received fragment for the overlapping portion to obtain a first variant of the data flow and then by using the bits from the later-received fragment for the overlapping portion to obtain a second variant of the data flow, and then both variants checked to determine if any attack signature is matched.

In some embodiments, a system or application may be configured to process overlapping fragments either as illustrated in FIG. 7 or as illustrated in FIG. 8. In some embodiments, a network security administrator may be provided with a way to select between the two approaches based on the requirements, capabilities, and/or limitations of their network, and/or their own preferences. In other embodiments, a security system/application may be configured to select dynamically between the two approaches based on such factors as the identity and criticality of the destination host associated with the flow, the current workload and/or other factors related to the processing resources available at or to the security host, and/or other dynamically determined or received factors, instructions, or information.

While a number of the foregoing embodiments focus primarily on performing further processing based on the detection of overlapping fragment, and/or the detection of mismatched data between overlapping fragments, the techniques described herein may be applied to any anomaly that may indicate that an attempt is being made to evade or deceive a security system, application, or process by taking advantage of known, actual, or potential differences in the way fragments, datagrams, packets, etc. are reassembled at a security host to reconstruct a data flow and the way the same fragments, datagrams, packets, etc. are reassembled at a destination (target) host.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for assembling fragmented network traffic, comprising:
    detecting, by a monitoring node, an anomaly in the fragmented network traffic whereby two or more fragments within the fragmented network traffic have overlapping offsets;
    performing a query of a destination node by the monitoring node to determine configuration information associated with how the destination node, to which the two or more fragments are addressed, is configured to reassemble overlapping fragments, wherein the monitoring node is different from the destination node; and
    reassembling the two or more fragments by the monitoring node according to the configuration information associated with the destination node.

2. The method as recited in claim 1 wherein determining that said two or more fragments have overlapping offsets comprises reading a header value associated with one of the fragments.

3. The method as recited in claim 2 wherein the header value comprises an offset value.

4. The method as recited in claim 1 wherein detecting an anomaly comprises determining that said two or more fragments overlap and that at least two of said fragments comprise different data for an overlapping portion of said fragments.

5. The method as recited in claim 1 wherein performing a query further includes querying an information base.

6. The method as recited in claim 1 further including processing the anomaly to determine whether the fragmented network traffic is associated with a threat.

7. The method as recited in claim 1 further including performing an action on the fragmented network traffic based on whether the fragmented network traffic is associated with a threat.

8. The method as recited in claim 1 further including discarding at least a portion of the fragmented network traffic if the fragmented network traffic is associated with a threat.

9. The method as recited in claim 1 further including copying one or more fragments comprising the fragmented network traffic to a buffer.

10. The method as recited in claim 1 further comprising sending an alert if an anomaly is detected.

11. The method as recited in claim 1 further comprising determining whether the fragmented network traffic should be blocked.

12. The method as recited in claim 1 further comprising determining whether the fragmented network traffic should be forwarded to the destination node.

13. The method as recited in claim 1 further comprising determining that two or more fragments contained in said fragmented network traffic have overlapping portions.

14. The method as recited in claim 1 wherein detecting an anomaly comprises determining that two or more fragments contained in said fragmented network traffic have mismatching overlapping portions.

15. The method of claim 1, further comprising initiating expanded buffering of fragments contained in said fragmented network traffic in response to detecting the anomaly.

16. A system for assembling fragmented network traffic, comprising:
    a memory configured to store at least a portion of the fragmented network traffic; and
    a processor configured to:
        detect, by the monitoring node, an anomaly in the fragmented network traffic whereby two or more fragments within the fragmented network traffic have overlapping offsets;
        perform a query of a destination node by the monitoring node to determine configuration information associated with how the destination node, to which the two or more fragments are addressed, is configured to reassemble overlapping fragments, wherein the monitoring node is different from the destination node; and
        reassemble the two or more fragments by the monitoring node according to the configuration information associated with the destination node.

17. The system of claim 16 wherein performing a query further includes querying an information base.

18. A non-transitory computer readable storage medium comprising computer instructions for assembling fragmented network traffic, including instructions for:
    detecting, by a monitoring node, an anomaly in the fragmented network traffic whereby two or more fragments within the fragmented network traffic have overlapping offsets;
    performing a query of a destination node by the monitoring node to determine configuration information associated with how the destination node, to which the two or more fragments are addressed, is configured to reassemble overlapping fragments, wherein the monitoring node is different from the destination node; and
    reassembling the two or more fragments by the monitoring node according to the configuration information associated with the destination node.

* * * * *